N. MARTINEZ.
TRANSMISSION MECHANISM.
APPLICATION FILED JULY 9, 1917.
1,266,971.
Patented May 21, 1918.
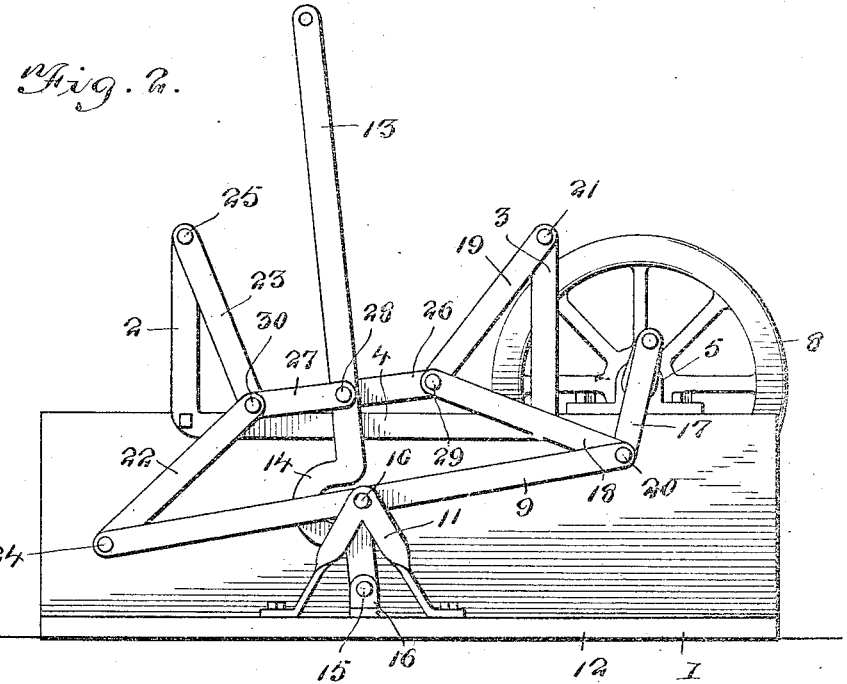
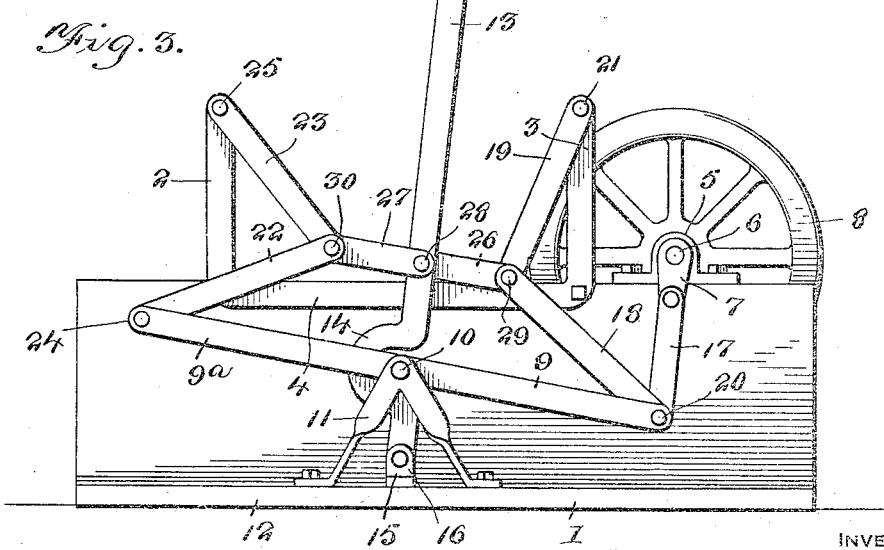
INVENTOR
Norberto Martinez
WITNESSES
BY Victor J. Evans
ATTORNEY

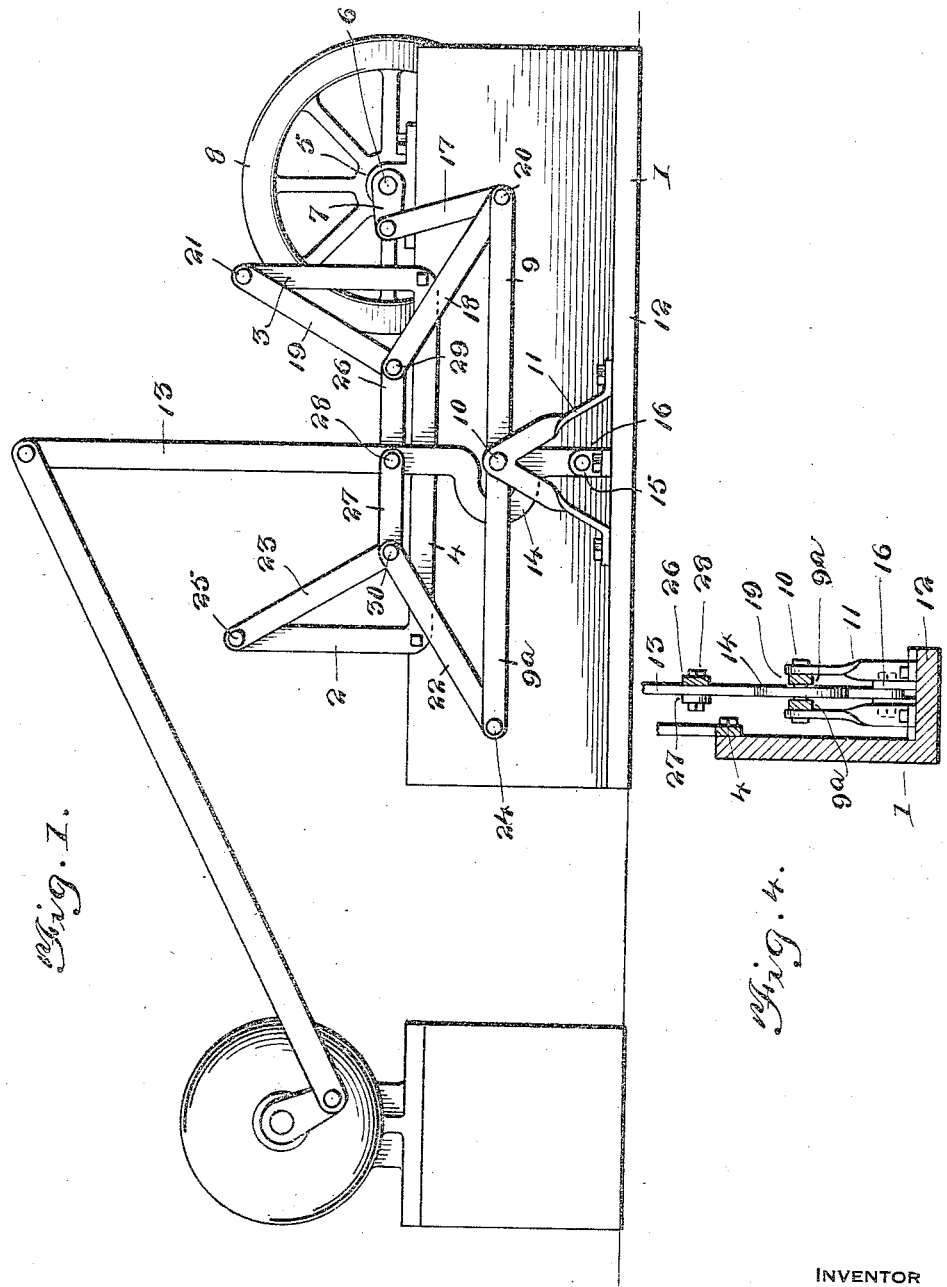

UNITED STATES PATENT OFFICE.

NORBERTO MARTINEZ, OF COTULLA, TEXAS.

TRANSMISSION MECHANISM.

1,266,971.

Specification of Letters Patent. Patented May 21, 1918.

Application filed July 9, 1917. Serial No. 179,473.

*To all whom it may concern:*

Be it known that I, NORBERTO MARTINEZ, a citizen of the United States, residing at Cotulla, in the county of Lasalle and State of Texas, have invented new and useful Improvements in Transmission Mechanisms, of which the following is a specification.

This invention is an improved transmission mechanism which may be operated by any suitable initial power, engine or the like and which serves to transmit motion to a rotary driven element and to increase or multiply the initial power, the object of the invention being to provide an improved transmission mechanism of this character in which a minimum number of parts is employed and the working thereof is uniform, steady, and without lost motion.

A further object of the invention is the provision of mechanism of this character which is simple in construction, thoroughly reliable and efficient in operation, and which is strong and durable and may be manufactured at small cost.

The invention consists in the construction, combination and arrangement of devices hereinafter described and claimed.

In the accompanying drawings:—

Figure 1 is a side elevation of a transmission mechanism constructed and arranged in accordance with my invention, and showing the lever thereof in intermediate, vertical position and the rocking beam in horizontal position.

Fig. 2 is a similar view of the same with the lever at one end of its stroke.

Fig. 3 is a similar view, with the lever at the opposite end of its stroke.

Fig. 4 is a vertical sectional view of the same.

In the embodiment of the invention here shown a base is indicated at 1 and provided on the upper side with a pair of standards 2, 3, which standards are here shown as formed integrally with a bar 4 which is bolted to the upper portion of the base. I would have it understood that the base may be of any suitable construction. A bearing 5 is provided on the upper side of the base and in which bearing a shaft 6 is mounted, the said shaft having a crank 7 at one end and a wheel or pulley 8 at the opposite end.

A rocking beam 9 is pivotally mounted as at 10 at a point midway between its ends on a suitable bracket or standard 11 which is secured on the lower portion 12 of the base. The rocking beam is here shown as comprising a pair of members 9ª which are suitably spaced apart. A lever 13 has a curved portion 14 arranged in the slot formed between the members of the rocking beam, the lower end of the lever being pivotally mounted as as 15 on a bracket 16 which is secured on the lower portion of the base. One end of the rocking beam is connected to the crank by a pitman 17. The said end of the rocking beam is also connected to the standard 2 by a pair of toggle links 18, 19. The link 18 is pivotally connected to the rocking beam and to the pitman as at 20. The link 19 is pivotally connected at a fixed point to the standard 2 as at 21. A similar pair of toggle links 22, 23 are respectively pivotally connected to the opposite end of the rocking beam and to the standard 3 at a fixed point as at 24, 25. Links 26, 27 are pivotally connected to the lever as at 28. The link 26 is pivotally connected to the toggle links 18, 19 as at 29 and the link 27 is pivotally connected to the toggle links 22, 23 as at 30.

The lever 13 may be connected to a moving element of any suitable engine or prime motor for operation thereby. When the lever is in vertical or intermediate position the rocking beam is horizontal. When the lever is moved in either direction the members of one pair of toggle links will turn to an increasingly less angle with respect to each other and thereby raise one end of the rocking beam while the members of the other pair of toggle links will turn to an increasingly greater angle with respect to each other and thereby depress the other end of the rocking beam. Hence the oscillatory movement of the lever, through the instrumentality of the links, will cause the rocking beam to rock and, by means of the pitman cause the shaft or other rotary element to revolve. The leverage of the toggle links increases the power of the transmission mechanism and the movements of the same are steady, regular, and lost motion is avoided.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. In power transmission mechanism of the class described, a rocking beam, a lever, and toggle links at opposite ends of the rocking beam, said toggle links being connected to the lever for operation simultaneously in reverse directions thereby, one link of each toggle being pivotally connected to one end of the rocking beam and the other link of each toggle being pivotally mounted at a fixed point.

2. In power transmission mechanism of the class described, a rocking beam, a lever, toggle links at opposite ends of the rocking beam, said toggle links being connected to the lever for operation simultaneously in reverse directions thereby, one link of each toggle being pivotally connected to one end of the rocking beam and the other link of each toggle being pivotally mounted at a fixed point, a revoluble driven element including a crank and a pitman connecting the rocking beam with the crank.

In testimony whereof I affix my signature.

NORBERTO MARTINEZ.

Copies of this patent may be obtained for five cents each, by addressing the "Commissioner of Patents, Washington, D. C."